(12) United States Patent
Ruppert

(10) Patent No.: US 12,483,178 B2
(45) Date of Patent: Nov. 25, 2025

(54) EXCITER CIRCUIT FOR AN EXTERNALLY EXCITED SYNCHRONOUS MACHINE AND MOTOR VEHICLE

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 211 days.

(21) Appl. No.: 18/339,974

(22) Filed: Jun. 22, 2023

(65) Prior Publication Data

US 2023/0421089 A1    Dec. 28, 2023

(30) Foreign Application Priority Data

Jun. 27, 2022 (DE) .......................... 102022115889.6

(51) Int. Cl.
| | | |
|---|---|---|
| *H02P 29/024* | (2016.01) | |
| *B60L 3/00* | (2019.01) | |
| *B60L 53/22* | (2019.01) | |

(52) U.S. Cl.
CPC ............ *H02P 29/025* (2013.01); *B60L 3/003* (2013.01); *B60L 3/0061* (2013.01); *B60L 53/22* (2019.02); *H02P 2207/05* (2013.01)

(58) Field of Classification Search
CPC ............... H02P 29/025; H02P 2207/05; H02P 29/0241; H02P 9/10; H02P 9/102; B60L 53/22; B60L 3/003; B60L 3/0061; B60L 2220/14; H05K 7/2089
USPC .................................................. 318/400.21
See application file for complete search history.

(56) References Cited

U.S. PATENT DOCUMENTS

| | | | |
|---|---|---|---|
| 1,784,235 A | * | 12/1930 | Jeffrey ................... H02K 19/12 |
| | | | 318/705 |
| 9,059,584 B2 | | 6/2015 | Spannhake et al. |
| 10,862,374 B2 | | 12/2020 | Sudan et al. |
| 2021/0075277 A1 | | 3/2021 | Schiedermeier et al. |

FOREIGN PATENT DOCUMENTS

| | | |
|---|---|---|
| CN | 203851070 U | 9/2014 |
| CN | 204794783 U | 11/2015 |
| DE | 102010001626 A1 | 8/2011 |
| DE | 102014209607 A1 | 11/2015 |
| DE | 102019124212 A1 | 3/2021 |

OTHER PUBLICATIONS

Ruppert et al. (DE 102014209607 A1).Rotor For A Synchronous Machine Date Published Nov. 26, 2015 (Year: 2015).*
Schiedermeier et al. (DE 102019124212 A1) Demagnetization Of The Rotor Of A Separately Excited Synchronous Machine Date Published Mar. 11, 2021 (Year: 2021).*
Kusase et al. (JP 2004328911 A).AC Generator for Vehicle (Year: 2004).*

* cited by examiner

*Primary Examiner* — Jorge L Carrasquillo
(74) *Attorney, Agent, or Firm* — Seed Intellectual Property Law Group LLP

(57) ABSTRACT

An exciter circuit for an externally excited synchronous machine, wherein the exciter circuit comprises power supply terminals connectable to a current source, exciter current terminals connectable to a rotor winding of a rotor of the synchronous machine, and a protection circuit which, in operation, connects conductively the power supply terminals when a triggering condition is fulfilled.

11 Claims, 3 Drawing Sheets

EXCITER CIRCUIT FOR AN EXTERNALLY EXCITED SYNCHRONOUS MACHINE AND MOTOR VEHICLE

BACKGROUND

Technical Field

The disclosure relates to an exciter circuit for an externally excited synchronous machine, wherein the exciter circuit comprises power supply terminals for connection to a current source and exciter current terminals for connection to a rotor winding of a rotor of the synchronous machine. In addition, the disclosure relates to a motor vehicle.

Description of the Related Art

Externally excited synchronous machines, which are also known as current-excited synchronous machines, are becoming increasingly relevant, since with externally excited synchronous machines as opposed to permanently excited synchronous machines one can do without the use of cost-intensive magnets in the rotor. The necessary magnetic field in the rotor is established with the aid of a direct current carried by way of a rotor winding, which can be taken to the rotor by slip rings in particular. For high-performance synchronous machines, such as the drive machines in motor vehicles, this direct current is provided by an additional power electronic switching section, which in present systems can have a power class of around 15 kW.

In high-performance synchronous machines the field of the rotor winding can have a high energy density in operation. For example, it is known from the publication DE 10 2010 001 626 A1 on the one hand how to break down the field by active rapid de-excitation when negative voltages are applied and on the other hand how to provide a protection circuit by which the rotor winding can be short circuited, for example when contact is lost with a control device or exciter circuit implementing the active field breakdown, due to contact problems.

During a rapid de-excitation or generally an active field breakdown, the energy of the rotor winding is fed back across the power supply terminals of the exciter circuit to the current source, i.e., back to a high-voltage network of the motor vehicle for example, and thus typically back to the battery. However, if the battery is disconnected from the high-voltage network or from the power supply terminals, for example in event of a load dump, during which the exciter circuit is disconnected from the battery by switches, the recovered energy would have to be taken up by other components, such as at least one intermediate circuit capacitor, which is hooked up between the power supply terminals.

Given the high energy densities desirable in the rotor winding, however, the capacitance of customary intermediate circuit capacitors is not sufficient to take up the energy which needs to be taken up upon de-excitation of the rotor winding, so that during a de-excitation with the battery disconnected there is a danger of overcharging and thus damaging the intermediate circuit capacitor, which could also result in the danger of a fire. Therefore, it must be assured that a rapid de-excitation only occurs when the recovered energy can also in fact be taken up by a battery or other components, which may prevent an advisable rapid de-excitation in certain circumstances, or the energy density of the rotor field needs to be limited so that it can be taken up by the intermediate circuit capacitor, thereby limiting the performance capability of the synchronous machine and/or making necessary very large intermediate circuit capacitors.

BRIEF SUMMARY

Thus, embodiments of the disclosure provide an improved exciter circuit for an externally excited synchronous machine, in particular one which makes possible a robust de-excitation of a rotor winding even after the battery is disconnected, without the energy density of the rotor winding field being limited by the capacitance of an intermediate circuit capacitor.

Embodiments of the disclosure provide an exciter circuit of the mentioned kind, wherein the exciter circuit comprises a protection circuit which connects conductively the power supply terminals of the exciter circuit when a triggering condition is fulfilled.

Thanks to the conductive connection of the power supply terminals, the voltage drop across the power supply terminals can be degraded entirely or especially down to a limit value when the triggering condition is fulfilled. Thus, with a suitable triggering condition, the voltage drop across the power supply terminals can be limited for example to a value which is slightly above the maximum voltage existing there when the power supply terminals are connected to a battery or a battery-powered onboard network. Therefore, as long as a connection with the battery exists, a short circuiting of the power supply terminals by the protection circuit can be prevented.

For example, if a rapid de-excitation of the rotor coil is activated while a battery or an onboard network is disconnected from the exciter circuit, the triggering condition can be fulfilled and the field energy of the rotor winding can thus be drained across the conductive connection of the power supply terminals and thus be transformed, especially by resistance, into heat.

The exciter circuit or that section of the exciter circuit which serves for building up and breaking down the field of the rotor winding can comprise two parallel control branches, each of which is hooked up between the power supply terminals. The control branches can each be connected across a diode to one of the power supply terminals and across an electrical switch, such as an IGBT, to the other of the power supply terminals, where the diodes of both control branches have the same conduction direction and the electrical switches connect an intermediate point of the respective control branch between diode and switch, which is connected to the rotor winding, to different ones of the power supply terminals. Then, when both electrical switches are switched on, the current can be built up in the rotor winding; if only one of the two electrical switches is switched on, a freewheeling can result, during which the current in the rotor winding is basically maintained; and if both switches are switched off, a recovery of the current of the rotor winding in an onboard network or the intermediate circuit capacitor or a battery can occur. This recovery is also known as rapid de-excitation.

The power supply terminals can additionally be connected together across at least one intermediate circuit capacitor. Such an intermediate circuit capacitor serves on the one hand for voltage stabilization in the DC voltage network powering the exciter circuit and on the other hand takes up at first a certain amount of current upon rapid de-excitation or a recovery of the current of the rotor winding, at least when the exciter circuit is disconnected from a battery or an onboard network, thereby increasing the voltage drop between the power supply terminals. On the one hand, this can be evaluated in the context of the triggering condition, and on the other hand a certain switching delay of the protection circuit is allowable, given the capacitance of the intermediate circuit capacitor.

The triggering condition can only be fulfilled when a voltage drop between the power supply terminals reaches or goes beyond a voltage limit value. The voltage limit value can be chosen in particular such that it is not reached or exceeded in normal operation of the exciter circuit, in which it is connected to a battery or an onboard network. This can prevent in robust manner the power supply terminals from becoming connected conductively while the exciter circuit is being powered by a battery, so that a short circuiting of the battery is prevented. By suitable choice of the voltage limit and the permissible operating voltage or destruction limit of the intermediate circuit capacitor, the voltage limit value can also be placed sufficiently far away from this voltage limit or destruction limit, so that a damaging of the intermediate circuit capacitor can be avoided in robust manner.

It can be provided in particular that upon fulfillment of a further triggering condition the protection circuit again separates the power supply terminals from each other, wherein the further triggering condition in particular is fulfilled, or can only be fulfilled, when the voltage limit value or another voltage limit value which is smaller in particular than the voltage limit value is reached or exceeded. Although the triggering of the protection circuit in this case results in a certain energy loss, nevertheless after sufficient breakdown of the field of the rotor winding or after a reconnection of the battery or the onboard network to the exciter circuit a normal operation of the exciter circuit is again possible.

The protection circuit can be or comprise a series circuit of multiple Zener diodes and/or multiple suppressor diodes.

In particular, the voltage limit value can be or exceed the sum of the breakdown voltages of the Zener diodes and/or suppressor diodes.

By using Zener diodes or suppressor diodes, a conductive connection of the power supply terminals can be accomplished when the voltage limit value is exceeded by slight technical expense, namely, simply by utilizing the properties of the Zener or suppressor diodes. When the conductor resistance is disregarded, a conductive connection can result when the sum of the breakdown voltages is exceeded by using only the series circuit of the Zener or suppressor diodes as a protection circuit. But when the conductor resistance cannot be disregarded or when a resistor is used additionally in series with the Zener or suppressor diodes, for example in order to limit the speed of the field collapse, which may be advisable for thermal reasons, although in the short term there may be larger voltage drops across an intermediate circuit capacitor for example, the result will be a voltage limit value which is larger than the sum of the breakdown voltages on account of the voltage drop across this resistor.

Preferably, the protection circuit solely contains passive electrical components, i.e., in particular, no electrical switches. Alternatively, it would also be possible for the protection circuit to contain an electrical switch, for example one designed as an IGBT or some other transistor, which is closed when the triggering condition is fulfilled, in order to connect the power supply terminals in a conductive manner. For example, the voltage drop between the power supply terminals could be divided by a voltage divider and this reduced voltage could be compared with the aid of a comparator to a limit value, which switches the transistor when the limit value is exceeded.

The protection circuit can also connect the power supply terminals to each other across multiple parallel switching branches upon fulfillment of the triggering condition. For example, multiple parallel switched strands of series connected Zener or suppressor diodes can be hooked up between the power supply terminals in order to form the protection circuit. This may be advantageous to achieve a smaller overall resistance of this connection upon fulfillment of the triggering condition or to reduce the thermal burden on the components of the protection circuit by reducing the amount of current taken through the respective branch.

The power supply terminals can be additionally connected to an inverter of the exciter circuit, which serves for powering at least one phase of the stator winding of the synchronous machine, in order to connect the inverter to the current source. The arrangement of the protection circuit between power supply terminals which feed both the inverter for at least one phase of the stator winding and also the partial circuit to provide the exciter current for the rotor winding of the rotor is advantageous for several reasons. On the one hand, intermediate circuit capacitors are typically used for both the partial circuit and for the inverter, so that a higher capacitance is switched between the power supply terminals in this case, so that in turn larger amounts of electricity can be taken up before a damaging of components potentially occurs. In this way, the connection of the power supply terminals by the protection circuit is somewhat less time-critical, so that a better flexibility is achieved in regard to the configuration of the protection circuit or the choice of components. On the other hand, the described circuitry also makes it possible to use the protection circuit to drain away the recovered current from stator phases through the protection circuit, if this should be required.

At least one component of the protection circuit, especially the Zener diodes and/or suppressor diodes, and at least one component of the inverter can be cooled by a common heat sink and/or a common active cooling. Inverters of high-performance synchronous machines, such as those of drive machines in motor vehicles, typically require a rather powerful and typically active cooling in any case, so that this cooling or this heat sink is also well suited to diverting the rather high energy inputs upon collapse of the field of the rotor winding through the protection circuit. Since, as explained above, the protection circuit is primarily relevant when the exciter circuit is disconnected from the onboard network or the battery and thus the inverter is generally not utilized when the triggering condition is fulfilled, or in any case not used for the field breakdown, there remains sufficient cooling capacity and inertia of the cooling circuit to carry away the heat of the protection circuits.

The heat sink, within which in particular at least one coolant duct for a coolant of the active cooling is laid, can carry the protection circuit and at least one power module of the inverter, which implements the at least one half-bridge or a full bridge. In particular, the heat sink can carry three power modules, each of them implementing a bridge circuit for one phase of the stator winding, and a circuit to provide the exciter current for the rotor windings and the protection circuit. In particular, the heat sink can carry all components of the exciter circuit. The arrangement of multiple power modules of the inverter on a heat sink is familiar in itself, so that the supplementing of the protection circuit according to the disclosure so that it is sufficiently cooled is possible with little expense.

Besides the exciter circuit according to the disclosure, the disclosure relates to a motor vehicle having an externally excited synchronous machine, wherein the motor vehicle comprises an exciter circuit according to the disclosure, and wherein the exciter current terminals are connected conductively to the rotor winding of the rotor of the synchronous machine.

The current source can be in particular a battery, especially a high-voltage battery, or an electrical network, especially a high-voltage network of the motor vehicle. The power supply terminals of the exciter circuit can be connected across switches, especially electrical switches, to the battery or generally to a current source or to an electricity network, especially a high-voltage network of the motor vehicle, for example in order to make possible a load dump, during which for example the battery or the exciter circuit should be disconnected from the onboard network of the motor vehicle. As explained, in this case the use of the protection circuit according to the disclosure is especially relevant.

If, as explained above, an inverter for at least one phase of the stator winding is integrated in the exciter circuit, its phase outputs can be connected to the respective phases of the stator.

BRIEF DESCRIPTION OF THE SEVERAL VIEWS OF THE DRAWINGS

Further benefits and details of the disclosure will emerge from the following exemplary embodiments as well as the accompanying drawings.

DETAILED DESCRIPTION

Figure 1:
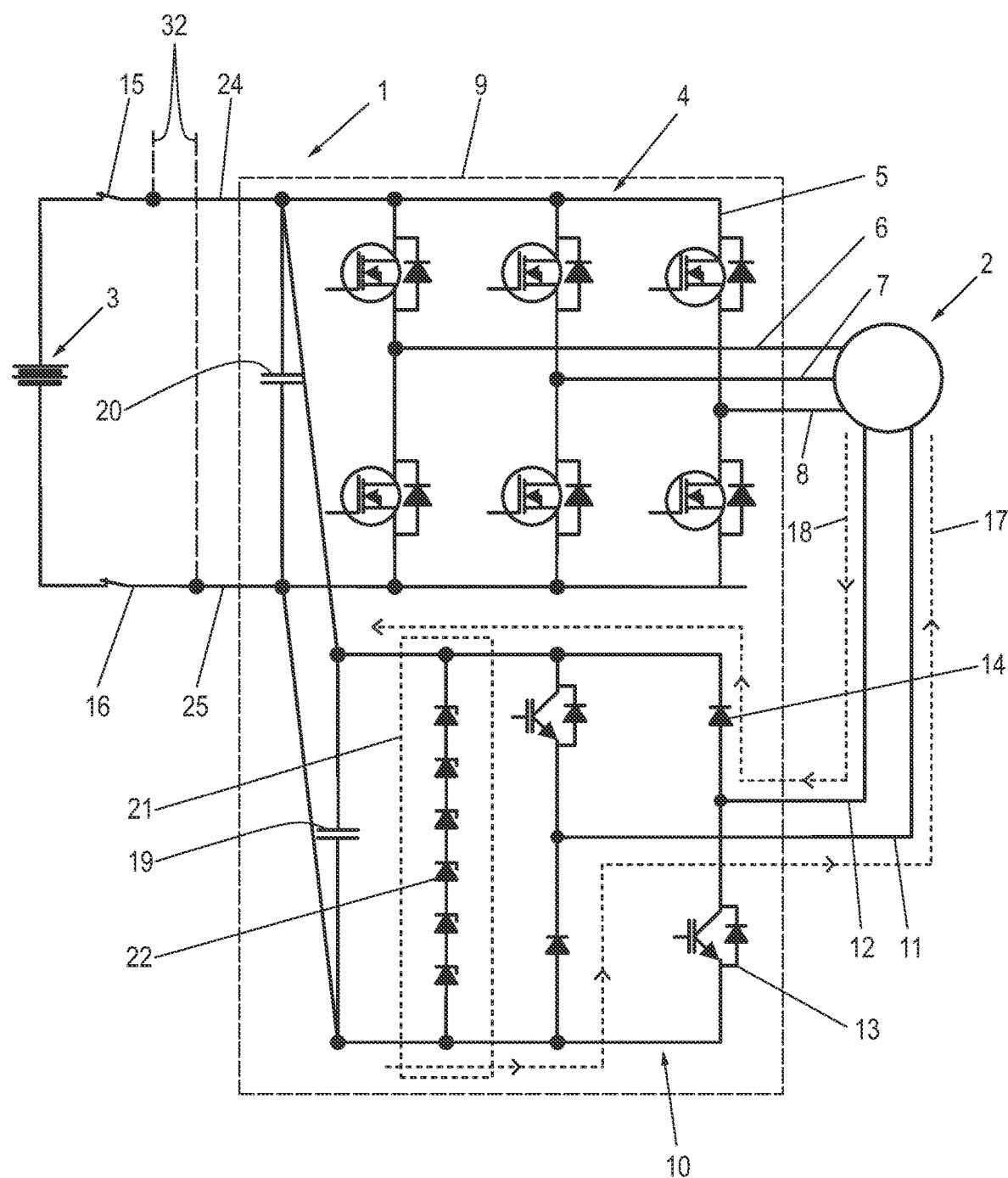
FIG. 1 shows an onboard network of an exemplary embodiment of a motor vehicle according to the disclosure having an exemplary embodiment of an exciter circuit according to the disclosure.

FIG. 1 shows schematically an onboard network 1 of a motor vehicle having a current source 3 (e.g., a battery), an externally excited synchronous machine 2, and an exciter circuit 9 for energizing the synchronous machine 2. The connection to further high-voltage consumers via the conductors 32 is only indicated schematically, since these are not relevant to the further discussion.

The exciter circuit 9 comprises a partial circuit 10, which is energized across the two power supply terminals 24, 25 of the exciter circuit 9 by the current source 3, i.e., a high-voltage battery for example, and which provides across the exciter current terminals 11, 12 the exciter current for the rotor winding of the externally excited synchronous machine 2. The partial circuit 10, in already known manner, comprises an intermediate circuit capacitor 19 and two control branches, each of which comprises an electrical switch 13, such as an IGBT or some other transistor, and a diode 14. The exciter current terminals 11, 12 are hooked up respectively between the electrical switch 13 and the diode 14 to one respective control branch.

FIG. 1 shows by the dashed-line arrows 17, 18 the current flow in the event that both switches 13 are closed, whereby energy stored in the rotor winding can be fed back to the current source 3. On the other hand, the field of the rotor winding is built up when both switches 13 are conductive. If only one of the switches 13 is conductive, this corresponds to a freewheeling, in which the field of the rotor winding is basically maintained and breaks down only slowly due to the resistance of the freewheeling.

If, as shown by the dashed arrows 17, 18, a field collapse and thus an energy recovery occurs, this energy will be fed, in the represented state, to the current source 3, i.e., to a high-voltage battery, for example. In the example shown, the current source 3 can be disconnected by the switches 15, 16 from the onboard network 1, for example to make possible a load dump. Alternatively or additionally, it may also be possible to disconnect the exciter circuit 9 from the current source 3 and the other high-voltage consumers across the conductors 32.

In both instances, the energy removed from the rotor winding or the current recovered from it can no longer be taken up by the current source 3, so in typical exciter circuits where the protection circuit 21 to be explained below is not present it would have to be taken up by the intermediate circuit capacitor 19 of the partial circuit 10 or the intermediate circuit capacitor 20 of an inverter 4, implemented in the present example as part of the exciter circuit 9. But since the capacitance of the intermediate circuit capacitors 19, 20 is typically much less than the capacitance of the current source 3, this can lead to an overcharging of the intermediate circuit capacitors 19, 20 and thus for example to a damaging of them or even a danger of fire, which is to be avoided.

In theory, it would be possible to allow a field collapse by closing both switches 13 of the partial circuit 10 only when the switches 15, 16 are closed. But this is problematical, since a field breakdown in the externally excited synchronous machine 2 is actually desirable when the exciter circuit 9 is currentless, in order to avoid an uncontrolled maintaining of the field, for example in event of an accident. Therefore, without the protection circuit 21, either very large-sized intermediate circuit capacitors 19 and/or 20 would have to be used, resulting in substantial increasing of costs, design space, and weight, which is ultimately not justifiable, or the field strength used for the rotor winding would have to be distinctly limited, but this would lead to less performance capability of the synchronous machine 2.

This problem is avoided in the exciter circuit 9 in that the exciter circuit 9 comprises the protection circuit 21, which connects the power supply terminals 24, 25 of the exciter circuit 9 in conductive manner when a triggering condition is fulfilled. The protection circuit 21 in the example is implemented as a series circuit of multiple Zener diodes. If the voltage drop across the intermediate circuit capacitor 19 and thus between the power supply terminals 24, 25 exceeds the sum of the breakdown voltages of the Zener diodes 22, these become conducting and further current recovered from the rotor winding can thus be drained away across the Zener diodes 23. After collapse of the rotor field and sufficient discharging of the intermediate circuit capacitors 19, 20, on the other hand, the sum of the breakdown voltage once more falls below the limit and the Zener diodes 22 again become blocking, thereby restoring the usual operating state.

The triggering condition in the example is thus the exceeding of a voltage limit value by the voltage drop between the power supply terminals 24, 25, whereupon the voltage limit value, disregarding conductor resistances, corresponds to the sum of the breakdown voltages of the Zener diodes 22. In theory, other configurations of the protection circuit 21 would also be possible, for example the use of an electrical switch for connecting the power supply terminals 24, 25, which will always be opened for example if the voltage drop between the power supply terminals 24, 25 exceeds a limit value. Alternatively or additionally, the triggering condition in this case could be to evaluate the switching state of the switches 15, 16, i.e., whether a battery is connected.

In the example, the power supply terminals 24, 25 which can be connected conductively across the protection circuit 21 also serve to feed an inverter 4 implemented as part of the exciter circuit 9, which feeds the three phases 6, 7, 8 of the stator winding of the synchronous machine 2. The inverter 4 is constructed in usual manner by six half-bridges 5. The benefits of this circuitry have already been explained in the general section.

Figure 2:
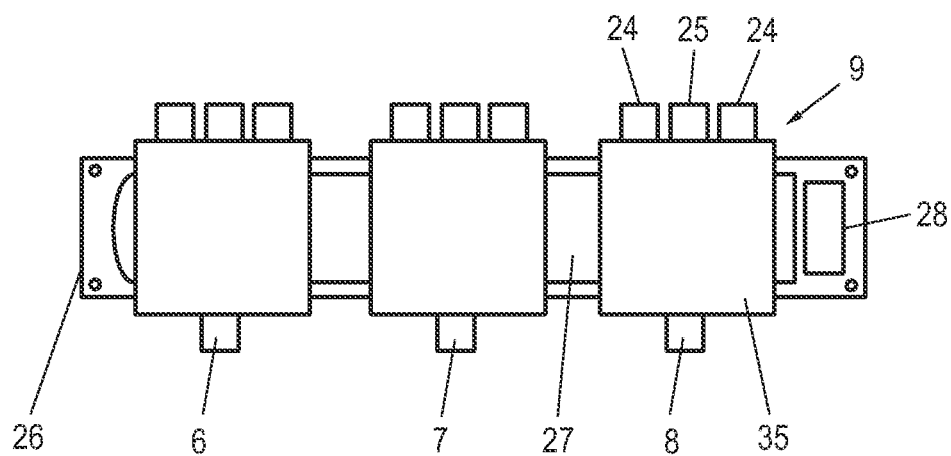
FIG. 2 shows an exemplary embodiment of an exciter circuit according to the disclosure.

FIG. 2 shows schematically one possible mechanical layout of the exciter circuit 9. The components of the exciter circuit 9 are carried here by a common heat sink 26, inside which a cooling duct 27 is led, being shown only schematically in the example. The heat sink 26 on the one hand carries three power modules 35 of the inverter 4, each of them implementing two of the half-bridges 5 and thus one full bridge for the respective phase 6, 7, 8. The respective power module 35 furthermore has contacts for the power supply terminals 24, 25. For reasons of clarity, the contacts for control voltages are not shown.

In addition, the heat sink 26 also carries a power module 28, which holds the partial circuit 10 already explained in regard to FIG. 1 including the protection circuit 21. This makes it possible for the components of the protection circuit 21, i.e., in particular the Zener diodes 22, to make contact with the heat sink 26 directly or across a good thermally conductive connection, so that when carrying away the field energy of the rotor winding across the protection circuit 21 the field energy converted into heat can be easily taken away.

Figure 3:
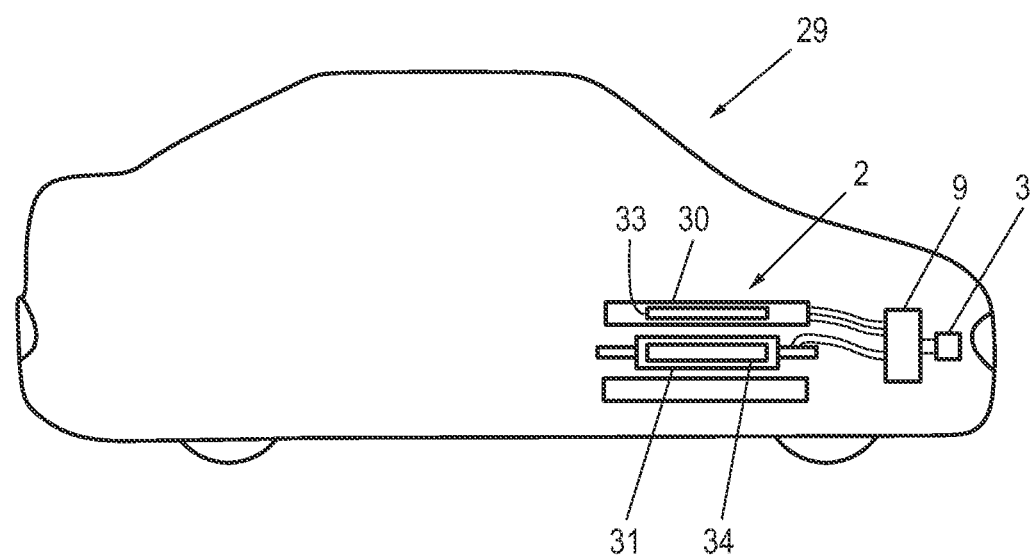
FIG. 3 shows an exemplary embodiment of a motor vehicle according to the disclosure.

FIG. 3 shows schematically the use of the explained exciter circuit 9 in a motor vehicle 29. The exciter circuit 9 here connects the current source 3, i.e., for example the high-voltage battery of the motor vehicle, on the one hand, to the rotor winding 34 of the rotor 31 of the synchronous machine 2 and, on the other hand, to a respective stator winding 33 of the stator 30 across the terminals for the phases 6, 7, 8.

Figure 4:
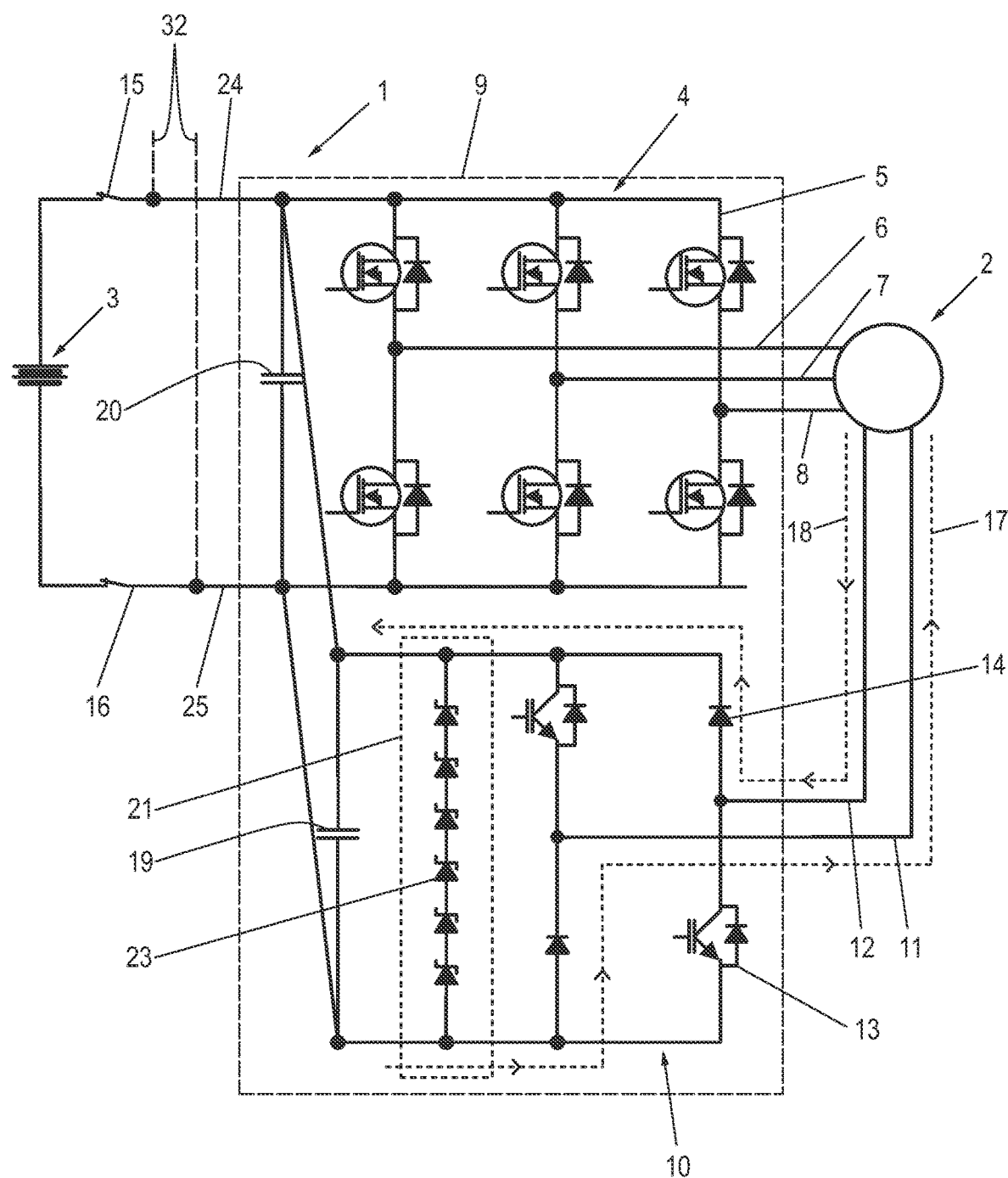
FIG. 4 shows a modification of the onboard network shown in FIG. 1 having a further exemplary embodiment of an exciter circuit according to the disclosure.

FIG. 4 shows an alternative configuration of the onboard network 1, in which an exciter circuit 9 is used with a slightly different protection circuit 21. Instead of the series circuit of Zener diodes 22 used in FIG. 1, a series circuit of suppressor diodes 23 is in FIG. 4.

The configuration shown in FIG. 1 or that in FIG. 4 can be advantageous depending on the requirements for performance capability and switching speed and depending on the available cooling capacity for the protection circuit 21.

The number of Zener diodes 22 or suppressor diodes 23 shown has been chosen to be relatively small, for reasons of easy comprehension, and in real applications typically a larger number of Zener or suppressor diodes 22, 23 will be used, depending on the voltages used in the onboard network 1.

As already explained in the general section, instead of a single strand of series connected Zener or suppressor diodes 22, 23 it is also possible to use multiple such parallel connected strands.

German patent application no. 10 2022 115 889.6, filed Jun. 27, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An exciter circuit for an externally excited synchronous machine, the exciter circuit comprising:
   a plurality of power supply terminals connectable to a current source;
   a first intermediate circuit capacitor that connects the power supply terminals;
   a plurality of exciter current terminals connectable to a rotor winding of a rotor of the synchronous machine; and
   a protection circuit which, in operation, connects conductively the power supply terminals when a triggering condition is fulfilled,
   wherein the protection circuit includes a second intermediate circuit capacitor that connects the power supply terminals, and
   wherein the first intermediate circuit capacitor and the second intermediate circuit capacitor are electrically connected in parallel.

2. The exciter circuit according to claim 1, wherein the triggering condition is fulfilled when a voltage drop between the power supply terminals is greater than or equal to a voltage limit value.

3. The exciter circuit according to claim 2, wherein the protection circuit includes a series circuit of multiple Zener diodes or multiple suppressor diodes.

4. The exciter circuit according to claim 3, wherein the voltage limit value is greater than or equal to a sum of breakdown voltages of the Zener diodes or suppressor diodes.

5. The exciter circuit according to claim 1, further comprising:
   an inverter which, in operation, powers at least one phase of a stator winding of the synchronous machine,
   wherein the power supply terminals are connected to the inverter to connect the inverter to the current source.

6. The exciter circuit according to claim 5, wherein at least one component of the protection circuit and at least one component of the inverter are cooled by a common heat sink.

7. The exciter circuit according to claim 6, wherein the at least one component of the protection circuit includes Zener diodes or suppressor diodes.

8. The exciter circuit according to claim 6, wherein the heat sink includes at least one coolant duct for a coolant which, in operation, actively cools the heat sink, and wherein the heat sink carries the protection circuit and at least one power module of the inverter that is configured as a one half-bridge or a full bridge.

9. The exciter circuit according to claim 1, further comprising:
   a plurality of switches that, in operation, selectively electrically connect and disconnect the plurality of power supply terminals to the current source,
   wherein the triggering condition is based on a switching state of at least one of the plurality of switches.

10. A motor vehicle, comprising:
    an externally excited synchronous machine; and
    an exciter circuit,
    wherein the exciter circuit includes:
        a plurality of power supply terminals connected to a current source;
        a first intermediate circuit capacitor that connects the power supply terminals;

a plurality of exciter current terminals connected conductively to a rotor winding of a rotor of the synchronous machine; and a protection circuit which, in operation, connects conductively the power supply terminals when a triggering condition is fulfilled, wherein the protection circuit includes a second intermediate circuit capacitor that connects the power supply terminals, and wherein the first intermediate circuit capacitor and the second intermediate circuit capacitor are electrically connected in parallel.

11. The motor vehicle according to claim 10, further comprising:

a plurality of switches that, in operation, selectively electrically connect and disconnect the plurality of power supply terminals to the current source, wherein the triggering condition is based on a switching state of at least one of the plurality of switches.

* * * * *